J. C. MILLER.
FERTILIZER DISTRIBUTER.
APPLICATION FILED JAN. 30, 1909.
920,974.
Patented May 11, 1909.
2 SHEETS—SHEET 1.
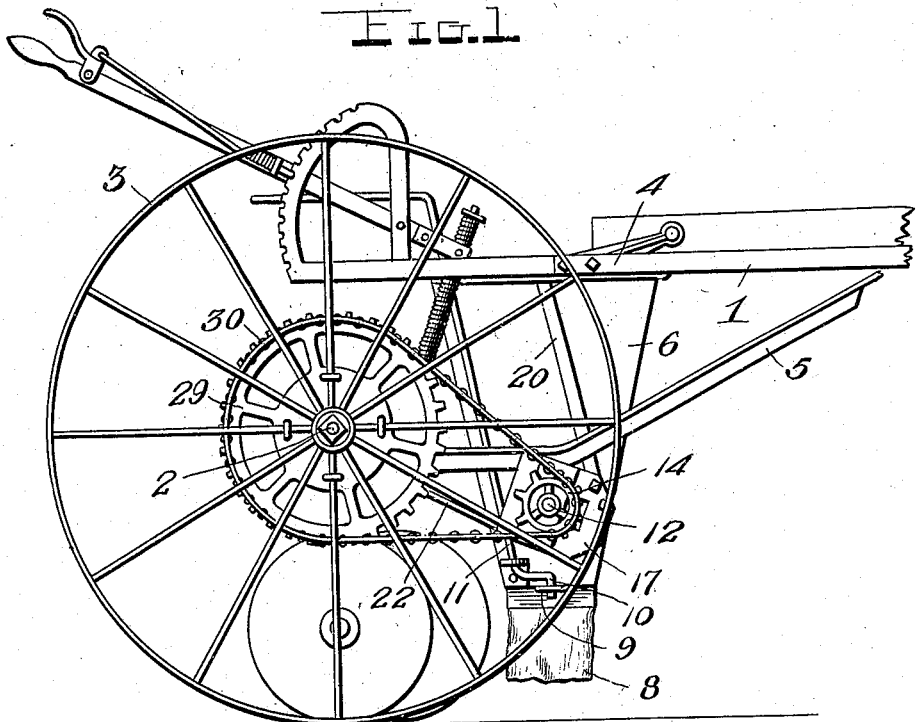
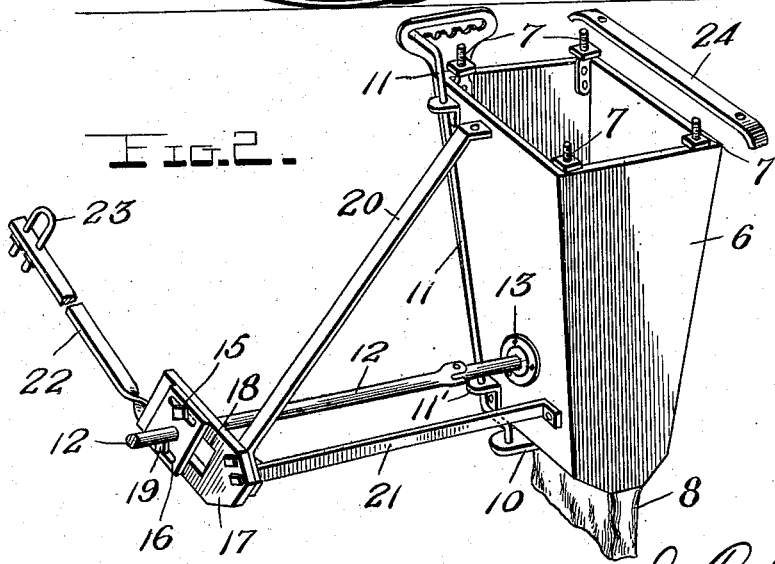
Witnesses
Chas. L. Griesbauer.
L. O. Little.
Inventor
J. C. Miller
By Watson E. Coleman
Attorney

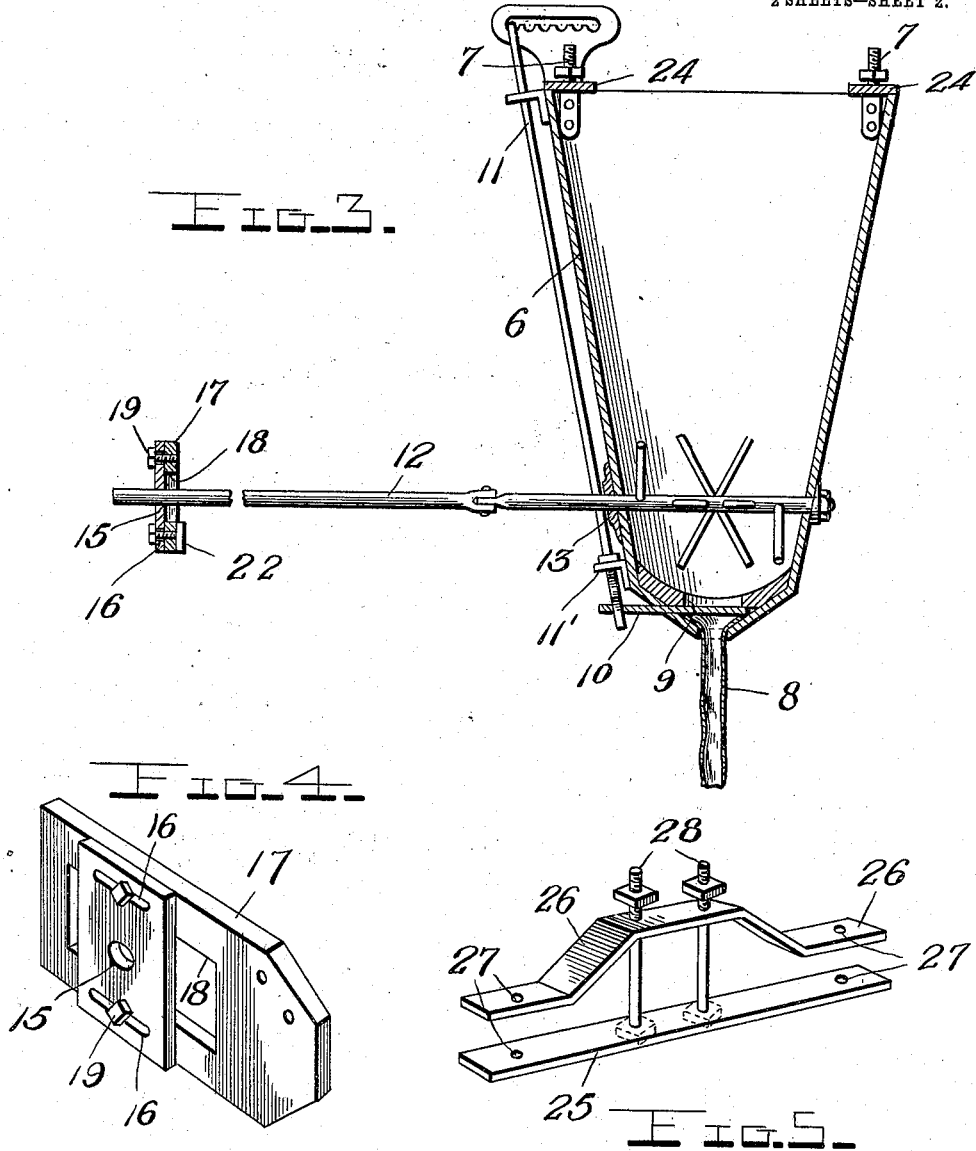

UNITED STATES PATENT OFFICE.

JOSHUA C. MILLER, OF NEW DECATUR, ALABAMA.

FERTILIZER-DISTRIBUTER.

No. 920,974.  Specification of Letters Patent.  Patented May 11, 1909.

Application filed January 30, 1909. Serial No. 475,135.

*To all whom it may concern:*

Be it known that I, JOSHUA C. MILLER, a citizen of the United States, residing at New Decatur, in the county of Morgan and State of Alabama, have invented certain new and useful Improvements in Fertilizer-Distributers, of which the following is a specification, reference being had to the accompanying drawings.

This invention comprises the construction of a fertilizer distributer adapted to be removably secured to a cultivator of any approved type.

One of the objects of the invention is the construction of an attachment for converting a cultivator into a combined cultivator and fertilizer distributer.

With the above and other objects in view the invention comprises certain combinations, constructions and arrangements of parts described in the following specification and illustrated in the accompanying drawings, in which, Figure 1 is a side elevation showing my improved device attached to a cultivator; Fig. 2 is a perspective view showing the device detached; Fig. 3 is a transverse section showing feed operating device; Fig. 4 is a detail view of a bearing member, and Fig. 5 is a detail elevation of a connecting member.

Referring to the accompanying drawings which are prepared for illustrative purposes and are accordingly not drawn to scale, the numeral 1 denotes a cultivator frame which is supported by means of a shaft or axle 2 upon traction wheels 3 journaled thereto. The cultivator frame illustrated comprises a forwardly extending support 4 which is connected directly to the axle or shaft 2 and is pivotally connected with implement supporting braces 5.

Connected to the forwardly extending support 4 is a fertilizer holder hopper 6, the connection between the hopper and the support being effected by means of screw bolts 7 located at the respective corners of the hopper and extending upwardly through openings formed in the support. On its lower end the hopper 6 is provided with a flexible chute 8 and is formed with an opening 9 in which a discharge regulating arm 10 moves. The arm 10 is pivotally connected on its outer end with an upwardly extending operating lever 11 which is supported at its lower end upon the hopper by a strap 11'. The upper end of the lever 11 is bent rearwardly so that by rocking the same in a horizontal plane the discharge controlling arm may be suitably manipulated. A rack having a plurality of numbered teeth is located on the upper end of the hopper for regulating the feed lever. The hopper 6 is further provided with a suitable feed controlling or feeding mechanism having connections with an operating shaft 12 which has one of its ends journaled to the hopper by a bearing member 13 and its other end secured to a sprocket wheel 14 and journaled on a bearing plate 15.

The bearing plate 15 has longitudinally formed slots 16, and is adjustably secured on a supporting plate 17, having a slot 18 formed therein, by set screws 19 extending through the slots 16. The supporting plate 17 is rigidly connected by means of an upwardly extending brace 20 with the supporting member 4 and by a horizontally extending brace 21 to the lower end of the hopper, thereby being held at a fixed distance between the hopper and the adjacent traction wheel. A third brace 22 is connected at its lower end to the supporting plate 17 and is provided at its upper end with a U-shaped slip 23 which is adapted to be connected to the axle 2, whereby the supporting plate 17 is rearwardly supported thereon. In order to effect a more perfect union of the hopper and the cultivator frame a pair of longitudinally extending rods 24 are secured on the supporting portion 4 of said frame and to the securing bolts 7. When it is desired to connect the attachment to a cultivator provided with a single draft beam or tongue I provide an attaching member comprising a straight cross bar 25 and an upwardly bowed cross bar 26, each being formed with bolt holes 27 located on their opposite ends and connected together by vertically extending bolts 28 which are suitably spaced apart thereon.

When the device has been attached in position on a cultivator which is provided with a suitable drive sprocket 29 secured to the wheel 3 by U-shaped bolts passed around the spokes thereof and by set screws threaded into the hub of the sprocket and against the hub of wheel 3, a drive chain 30 is passed over the drive sprocket and the driven sprocket 14 so as to impart motion from the shaft 2 to the feeder shaft 12 when the cultivator is suitably propelled over the ground. In order to effect a proper tension of the chain 30 the bearing plate 15 may be adjusted on the supporting plate 17 in the proper direction by means of the bolts 19 extending through the slots 16 of said bearing plate.

My invention provides means whereby a cultivator may be quickly converted into a combined cultivator and fertilizer distributer at a small cost, and is so constructed that it may be quickly detached when secured to a cultivator.

Having described my invention I desire to secure by Letters Patent:

1. In combination with a wheeled cultivator frame, a feed hopper, bolts for securing the hopper to the frame, feed mechanism located in the hopper, a shaft extending into the hopper connected with the feed mechanism, a bearing plate for the outer end of the shaft, a supporting plate adjustably secured to the bearing plate, a brace for supporting the supporting plate on the frame, a sprocket mounted on the shaft, and a drive chain connected with the sprocket and a sprocket on the axle of the cultivator shaft for operating the feed mechanism.

2. In combination, a cultivator frame having supporting wheels journaled to a shaft secured to said frame, a hopper having feed mechanism located therein, bolts secured to the hopper and extending through the frame for detachably securing the hopper thereto, a shaft connected to the feed mechanism and journaled at one end to the hopper, a bearing plate formed with spaced longitudinal slots connected with the shaft last mentioned, a supporting plate having bolts adjustable in the slots of the bearing plate, a brace for connecting the supporting plate to the frame, a brace having a U-shaped clip at its upper end for supporting the supporting plate on the shaft, a sprocket wheel mounted on the shaft of the cultivator, a sprocket wheel mounted on the feed shaft, a chain for connecting the sprockets, a discharge controlling member located in the bottom of the hopper and a lever having a rearwardly bent upper end for operating the discharge member.

In testimony whereof I hereunto affix my signature in the presence of two witnesses.

JOSHUA C. MILLER.

Witnesses:
P. EMENS,
EDWARD MOSELEY.